United States Patent
Furukawa et al.

(10) Patent No.: US 7,406,513 B2
(45) Date of Patent: Jul. 29, 2008

(54) DEVICE AND METHOD FOR USING MAC ADDRESS OF NETWORKED DEVICES TO SET IP ADDRESSES

(75) Inventors: Akihiro Furukawa, Nagoya (JP); Koshi Fukazawa, Nagoya (JP); Kiyotaka Ohara, Nagoya (JP); Masaaki Hibino, Yokkaichi (JP); Hideki Nogawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 542 days.

(21) Appl. No.: 09/820,761

(22) Filed: Mar. 30, 2001

(65) Prior Publication Data
US 2001/0039590 A1 Nov. 8, 2001

(30) Foreign Application Priority Data
Mar. 30, 2000 (JP) ............................. 2000-095108

(51) Int. Cl.
*G06F 15/177* (2006.01)
*G06F 15/16* (2006.01)

(52) U.S. Cl. ................. 709/220; 709/221; 709/228; 713/100

(58) Field of Classification Search ............. 709/230, 709/250, 220–226; 370/395.53, 400–401
See application file for complete search history.

(56) References Cited

U.S. PATENT DOCUMENTS

| | | | | |
|---|---|---|---|---|
| 5,835,725 A | * | 11/1998 | Chiang et al. | 709/228 |
| 5,982,773 A | * | 11/1999 | Nishimura et al. | 370/395.53 |
| 6,118,771 A | * | 9/2000 | Tajika et al. | 370/328 |
| 6,286,038 B1 | * | 9/2001 | Reichmeyer et al. | 709/220 |
| 6,330,238 B1 | | 12/2001 | Ooe | |
| 6,331,983 B1 | * | 12/2001 | Haggerty et al. | 370/400 |
| 6,434,620 B1 | * | 8/2002 | Boucher et al. | 709/230 |

(Continued)

FOREIGN PATENT DOCUMENTS

JP   A-10-28124   1/1998

(Continued)

OTHER PUBLICATIONS

"a proposed modification to ARP", Shriver et al. 1988.*

(Continued)

*Primary Examiner*—F. Zeender
*Assistant Examiner*—Ramsey Refai
(74) *Attorney, Agent, or Firm*—Oliff & Berridge, PLC

(57) ABSTRACT

An IP address setting device includes a request packet transmitting unit, a response reception unit, an address information designation unit, and a setting packet transmission unit. The request packet transmitting unit transmits a request packet to a particular multicast address. The request packet requests transmission of an MAC address from each node of the network. The response reception unit receives responses from the nodes to the request packet. Each response includes the MAC address of a corresponding node. Based on the responses received, the address information designation unit designates a node to be set with address information including an IP address and designates the address information. The setting packet transmission unit transmits a setting packet to the particular multicast address. The setting packet includes the address information set by the address information designation unit and the MAC address included in the response from the node.

4 Claims, 5 Drawing Sheets

U.S. PATENT DOCUMENTS

| | | |
|---|---|---|
| 6,449,054 B1 * | 9/2002 | Cox et al. .................. 358/1.15 |
| 6,466,986 B1 * | 10/2002 | Sawyer et al. ............... 709/245 |
| 6,496,859 B2 * | 12/2002 | Roy et al. ................... 709/223 |
| 6,574,644 B2 * | 6/2003 | Hsu et al. ................ 715/501.1 |
| 6,577,642 B1 * | 6/2003 | Fijolek et al. ............... 370/465 |
| 6,584,096 B1 * | 6/2003 | Allan ........................ 370/352 |
| 6,640,251 B1 * | 10/2003 | Wiget et al. ................ 709/238 |
| 6,801,949 B1 * | 10/2004 | Bruck et al. ............... 709/232 |
| 7,298,508 B2 * | 11/2007 | Furukawa et al. .......... 358/1.15 |

FOREIGN PATENT DOCUMENTS

| | | |
|---|---|---|
| JP | A-11-53143 | 2/1999 |
| JP | A-11-212940 | 8/1999 |

OTHER PUBLICATIONS

"RFC 966", Eering et al. 1985.*

* cited by examiner

PRIOR ART

DEVICE AND METHOD FOR USING MAC ADDRESS OF NETWORKED DEVICES TO SET IP ADDRESSES

BACKGROUND OF THE INVENTION

1. Field of the Invention

The present invention relates to a device and a method for setting address information, such as IP address, of a network device in a network environment.

2. Description of the Related Art

Conventionally, address information, such as the IP address, can be set for a device, such as a network printer, connected in a network environment using any of the following three methods.

According to a first method, the user inputs the address information by operating input buttons of the device while watching a display unit, such as a liquid crystal display, that is attached to the network device.

According to a second method, a host computer connected to the network is used to set the IP address using a local transmission protocol other than TCP/IP.

A third method is represented by FIG. 1. According to the third method, a host computer connected to the network broadcasts a command to all network devices, requesting that each network device advise its Media Access Control (MAC) address. The host computer confirms the MAC addresses of responding network devices and selects a network device it wants to set an IP address and the like for. The host computer broadcasts a command indicating that the network device with the MAC address of the selected network device should set its IP address and the like as indicated in the command. The corresponding network device sets its address information, such as IP address, based on the command.

SUMMARY OF THE INVENTION

There is, a problem with the first method in that each network device must be provided with a display unit. If the network device is not provided with a display unit, for example, to reduce manufacturing costs, then its IP address and the like cannot be set using this method.

There is a problem with the second method in that another transmission protocol besides TCP/IP is used, so this method cannot be used if the host computer 300 or the network environment cannot support the other transmission protocol.

There is a problem with the third method in that commands need to be broadcast transmitted, which adds to the burden on the network. Further, normally routers set up in the network environment do not allow broadcasted packets to pass through the router. Therefore, this method is frequently unusable for setting an IP address to a network device located on the other side of a router.

It is an objective of the present invention to overcome the above-described problems and to provide a device and method capable of using a transmission protocol normally supported in a network environment to set IP address and the like of network devices that have no display unit or that are connected to the network at the other side of a router, while suppressing the burden on the network.

In order to achieve the above-described objectives, an IP address setting device according to the present invention includes a request packet transmitting unit, a response reception unit, an address information designation unit, and a setting packet transmission unit. The request packet transmitting unit transmits a request packet to a particular multicast address. The request packet requests transmission of an MAC address from each node of the network. The response reception unit receives responses from the nodes to the request packet transmitted by the request packet transmitting unit. Each response includes the MAC address of the corresponding node. Based on the responses received from the nodes by the response reception unit, the address information designation unit designates a node to be set with address information including an IP address and designates the address information. The setting packet transmission unit transmits a setting packet to the particular multicast address. The setting packet includes the address information set by the address information designation unit and the MAC address included in the response from the node.

With this configuration, even inexpensive network devices without a display unit can be set with an IP address and the like. The settings can be made using a transmission protocol usually supported in a network environment, without placing an excessive load on the network, and to network devices on the other side of the router.

It is desirable that the address information designation unit include a display that displays a list with at least a portion of nodes that transmitted response packets; a selection unit that enables a user to select from the list the node to be set with address information; and an address information setting unit that sets address information separately to the selected node. With this configuration, nodes, that is, network devices such as network printers, to be set with address information can be selected from nodes in a network environment.

It is desirable that the address information designation unit include a display unit that displays in a list at least a portion of network printers at nodes that transmitted a response packet. With this configuration, network printers in the network environment can be displayed an the display and those network printers to be set with address information can be selected from the list.

It is desirable that the address information designation unit designate address information including an IP address, a subnet mask, and a default gateway. With this configuration, address information, such as an IP address, a subnet mask, and a default gateway address, can be set in a TCP/IP protocol.

It is desirable that the IP address setting device further include a response unit that transmits to the particular multicast address a response packet including an MAC address of a network printer connected at a node that is a member of the particular multicast address; a packet reception unit that receives, at the node, packets from the particular multicast address and that determines whether a received packet includes the MAC address of the network printer; and an IP address setting unit that, when the packet content determination unit determines that a received packet includes the MAC address of the network printer, sets the address information including the IP address in the setting packet as address information of the network printer. With this configuration, a network device can notify its MAC address to an IP address setting device in response to a request packet from the IP address setting device and set address information in a setting packet from the IP address setting device as its own address information A method according to the present invention the present invention includes transmitting a request packet to a particular multicast address, the request packet including a request for an MAC address of each node of a network; transmitting, from a node that is a member of the multicast address and that received the request packet, a response packet to the particular multicast address, the response packet including the MAC address of the node; receiving the response packet; designating to set the node that sent the response packet with address information including an IP address; transmitting to the particular multicast address a setting packet including the designated address information and the MAC address indicated in the response packet from the node; receiving the setting packet at the node; judging whether the MAC address in the received setting packet is the same as the MAC address of the node; and setting the address information in the setting packet as the address information of the node when the MAC address in the received setting packet is the same as the MAC address of the node.

A network printer according to the present invention includes a request packet reception unit that receives a request packet from a particular multicast address, the request packet requesting transmission of an MAC address; a response unit that transmits to the particular multicast address a response packet including a network printer MAC address, a setting packet reception unit that receives a setting packet from the particular multicast address; a content determination unit that determines whether the received setting packet includes the network printer MAC address; and an IP address setting unit that, when the packet content determination unit determines that the received setting packet includes the network printer MAC address, sets the address information including the IP address in the setting packet as address information.

BRIEF DESCRIPTION OF THE DRAWINGS

The above and other objects, features and advantages of the invention will become more apparent from reading the following description of the embodiment taken in connection with the accompanying drawings in which:

FIG. 4 (b) is a schematic view representing communication between the host computer and the network devices;

FIG. 4 (c) is a schematic view representing communication between the host computer and the network devices;

FIG. 4 (d) is a schematic view representing communication between the host computer and the network devices ;

DETAILED DESCRIPTION OF THE PREFERRED EMBODIMENT

Next, an explanation of a method and device for setting an IP address will be provided while referring to the attached drawings.

Figure 1:
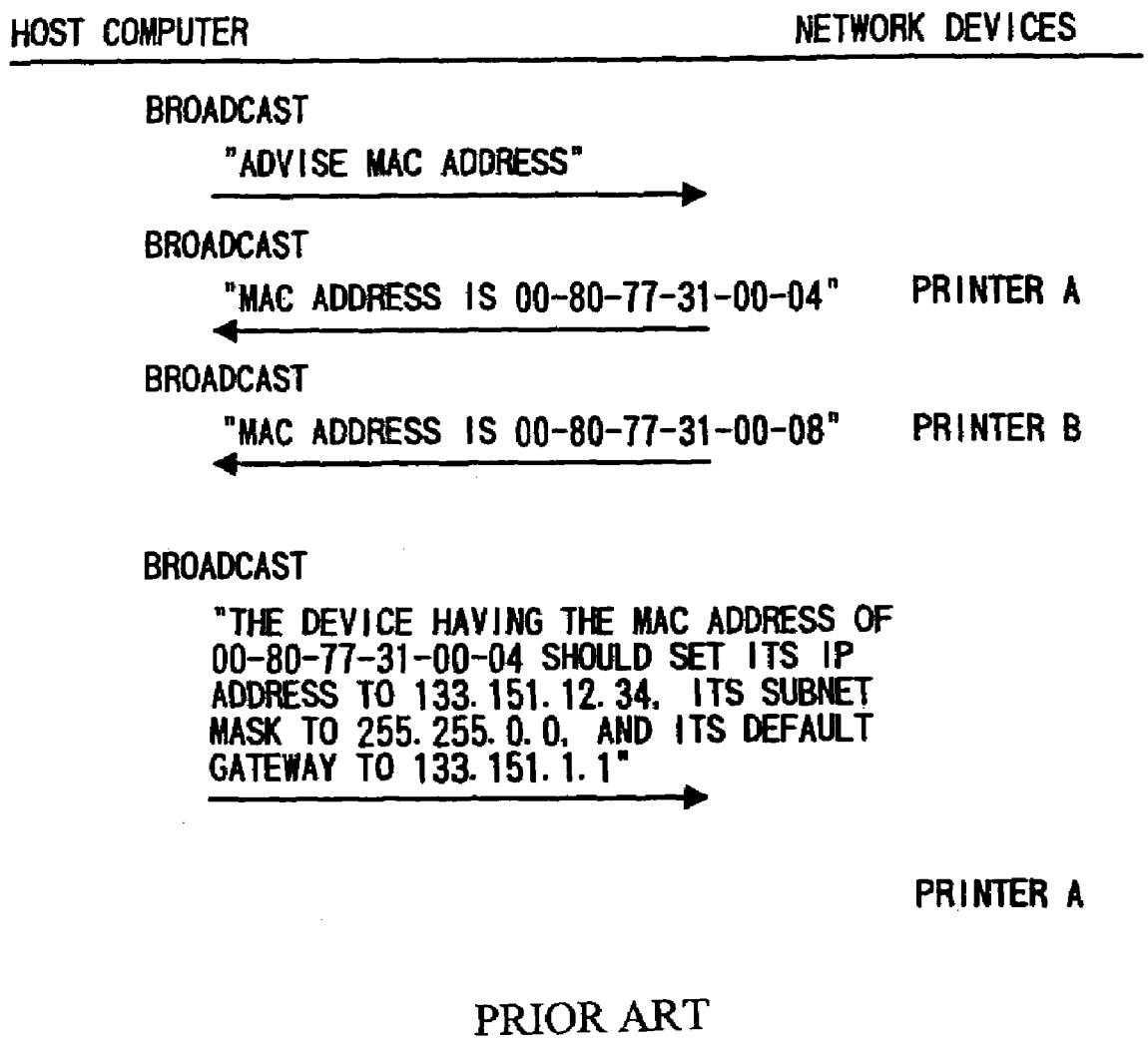
FIG. 1 is a schematic view representing one conventional method for setting address information to a network device.
Figure 2:
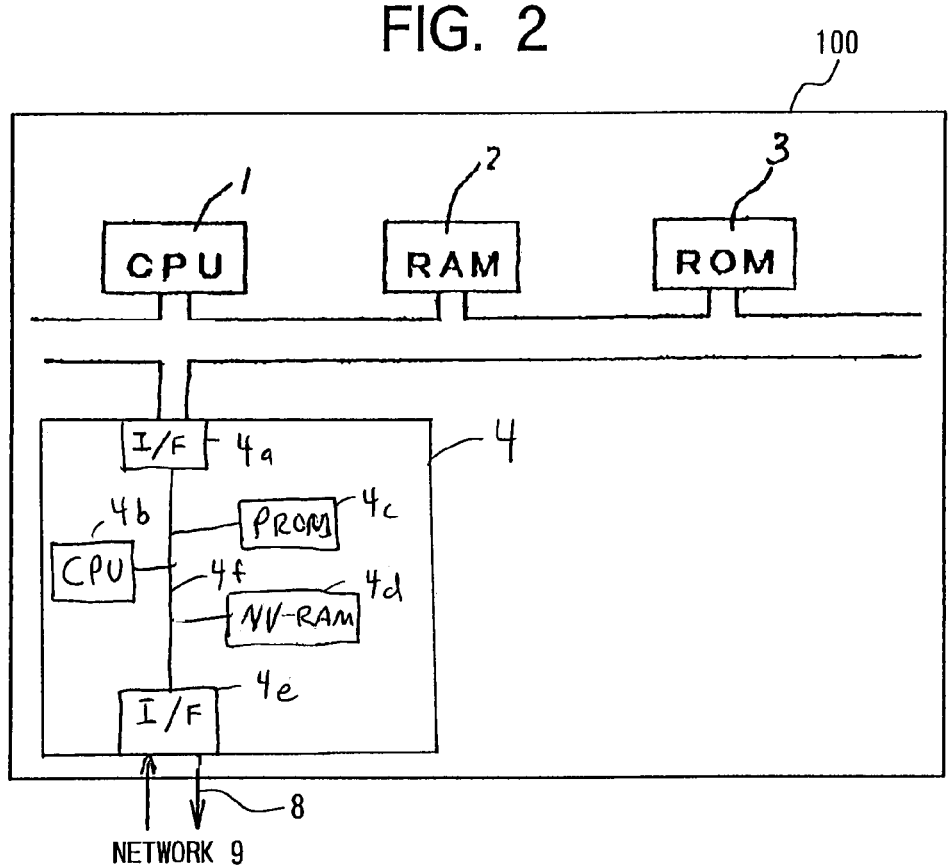
FIG. 2 is a block diagram showing internal configuration of a network device.

FIG. 2 shows a portion of hardware configuration of a network printer 100. The network printer 100 includes a central processing unit (CPU) 1, a random access memory (RAM) 2, a read only memory (ROM) 3, and a network interface card (NIC) 4, which is also commonly referred to as a LAN card The NIC 4 includes interfaces 4a and 4e, a CPU 44, a PROM 4c, and a non-volatile RAM (NV-RAM) 4d, all connected to a bus 4f. The NIC 4 can be provided as an integral component of the network printer 100 or as a separate and detachable unit. The PROM 4c stores the unique media access control (MAC) address of the NIC 4. The MAC address is a 6-byte address used as the address in frame headers transmitted over the network 9 and can be, for example, a maker code or a manufacture number. According to the present embodiment, the network printer 100 has a MAC address of 00-80-77-31-00-04. A network printer 200 has a MAC address of 00-80-77-31-00-08. The Nv-RAM 4d is for storing an IP address, which is set to the printer 100 in a manner to be described later.

Figure 3:
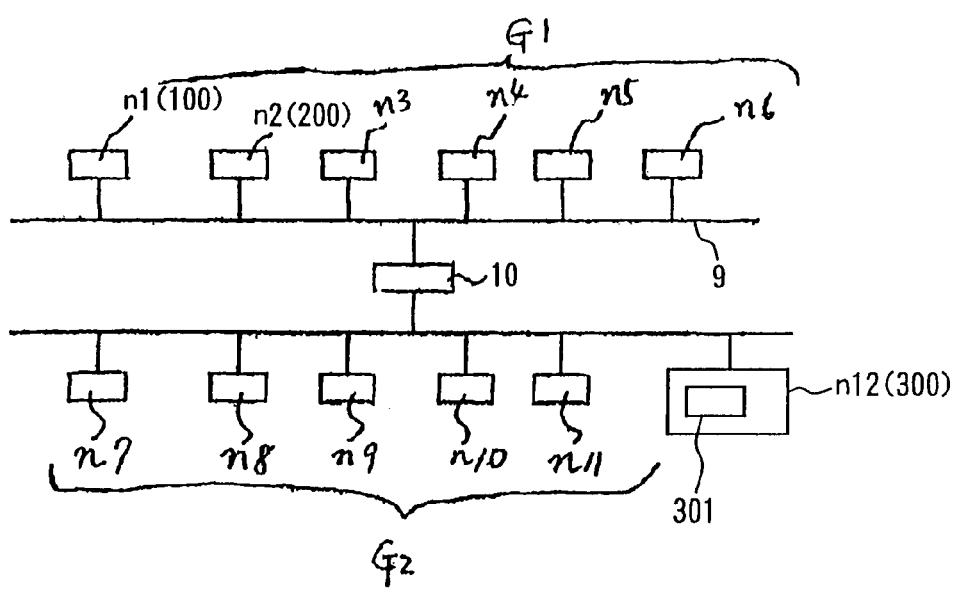
FIG. 3 is a block diagram showing a printing system including the network printer of FIG. 2.

FIG. 3 shows the entire network 9 with the network printer 100 connected at a node n1. The network 9 includes two groups G1 and G2 connected by a router 10. The first group G1 includes nodes n1 to n6 and the second group G2 includes nodes n7 to n12. A network printer 200 is connected at node n2 of group G1 and a computer 300 is connected at node n12 of group G2. The host computer 300 includes a display unit 301, such as a cathode ray tube (CRT). The router 10 is a multicast router, so address information, such as IP address, can be set for the network printer 100 and other devices at the nodes n1 to n6 on one side of the router 10 from the host computer 300 at a node on the other side of the router 10.

Figure 4:
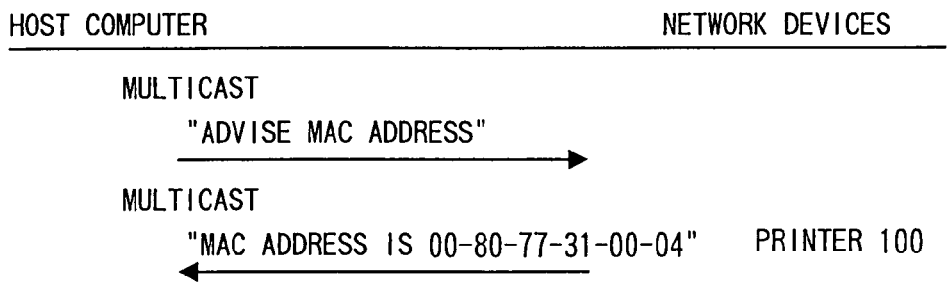
FIG. 4 (a) is a schematic view representing communication between a host computer and network devices of the printing system of FIG. 3.
Figure 4:
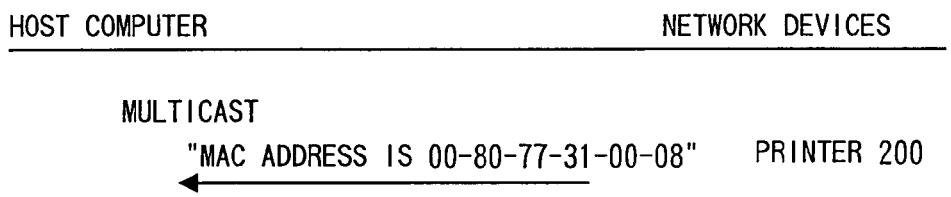
Figure 4:
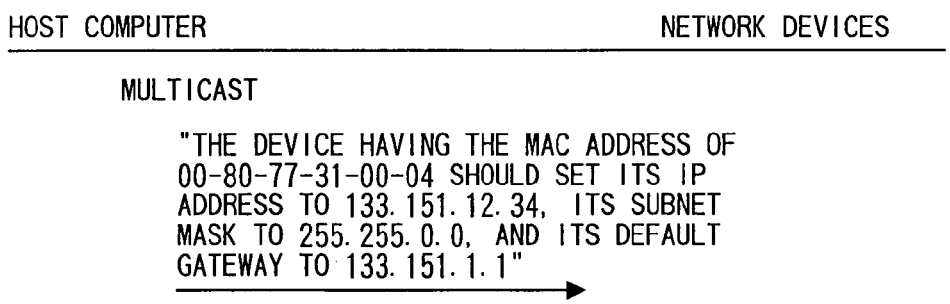
Figure 4:
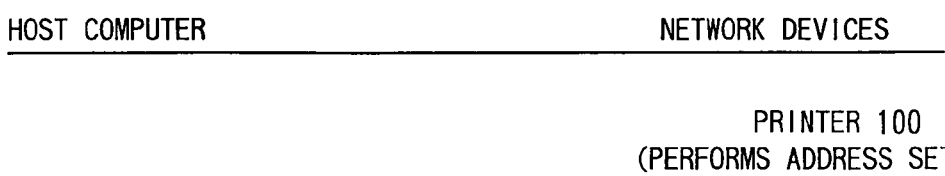

When an address such as an IP address of a network printer is to be set, then as shown in FIG. 4 (a) the host computer 300 transmits a packet to a particular multicast address (239.255.22.23). The packet includes a request for recipients of the packet to advise their own MAC address. In the example of FIG. 4 (a), the network printers 100 and 200 receive the packet and so return a packet including their own MAC addresses to the particular multicast address.

Once the host computer 300 receives the responses from the network printers 100 and 200, then the host computer 300 determines which of these network printers need to be set with address information including an IP address. The host computer 300 sets the address information to desired network printer or printers by transmitting a packet to the multicast address for each of the target network printers. Each packet includes the MAC address of the target network printer and the address information to be set to the target network printer. In the example shown in FIG. 4 (c), the host computer 300 judges that address information need only be set to the printer 100 and so sends a packet for the printer 100, but not for the printer 200, to the multicast address. The packet sent from the host computer 300 to the multicast address includes the MAC address of the network printer 100 and, as address information, an IP address of 133.151.12.34, a subnet mask of 255.255.0.0, and a default gateway of 133.151.1.1. When the printer 100 receives this packet, it recognizes its own MAC address and so, as shown in FIG. 4 (d), the printer 100 sets the address information, such as the IP address, in the packet as its own address information.

Figure 5:
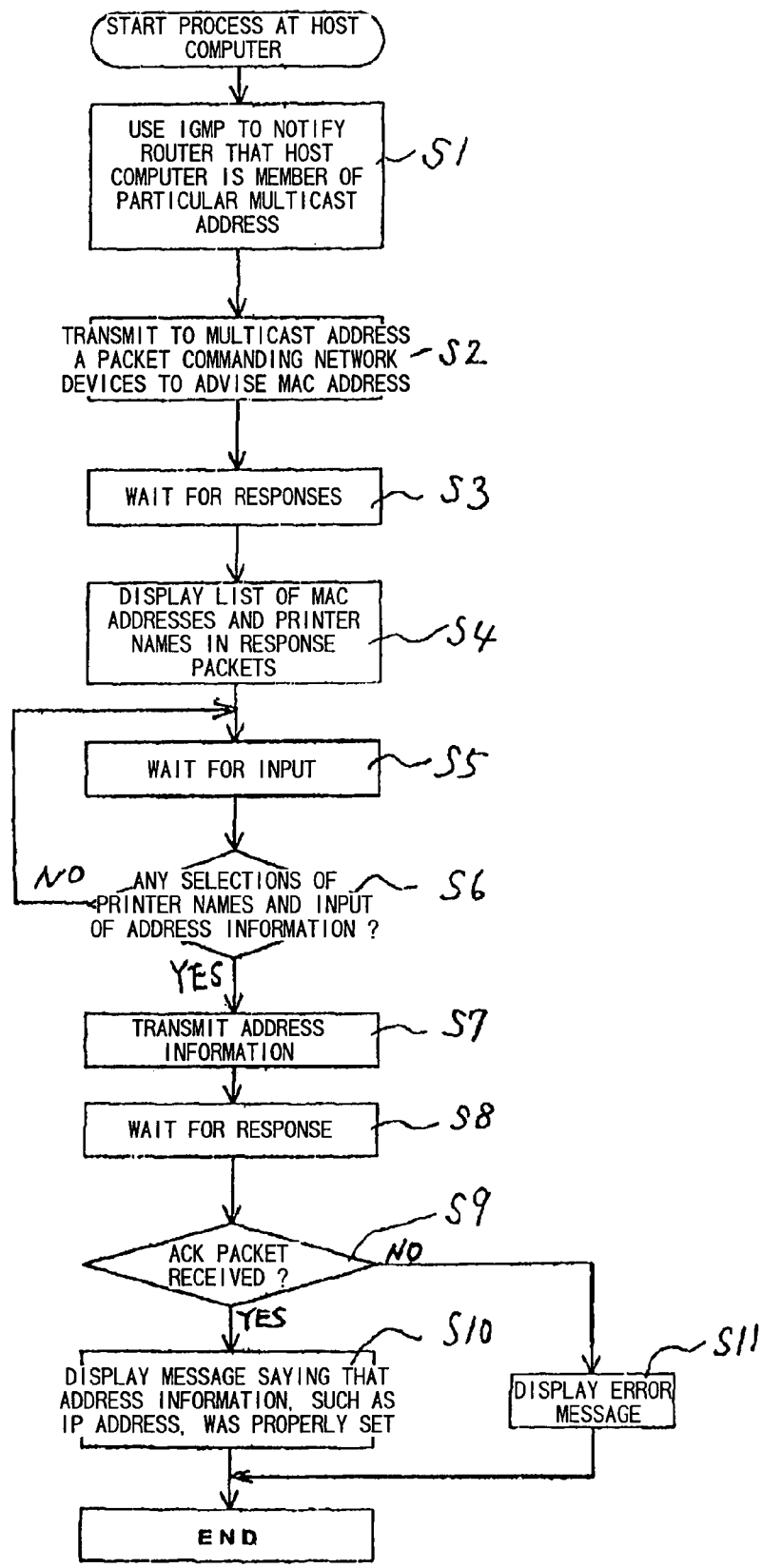
FIG. 5 is a flowchart representing processes performed in the host computer.
Figure 6:
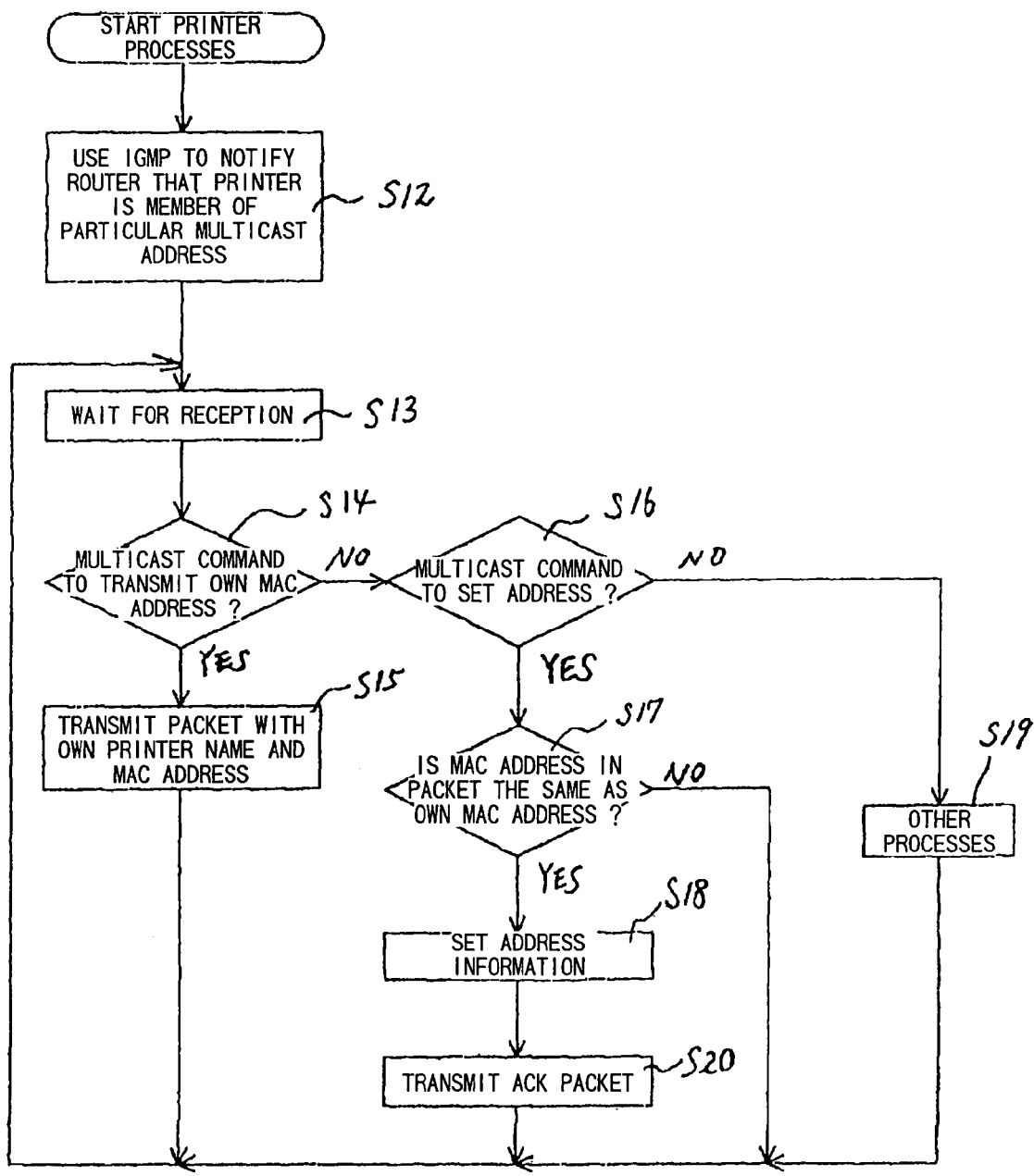
FIG. 6 is a flowchart representing processes performed in a network printer, which is one of the network devices of the printing system.

Next, a detailed explanation Will be provided for the above-described processes while referring to the flowcharts in FIGS. 5 and 6. FIG. 5 is a flowchart representing processes performed in the host computer 300 and FIG. 6 is a flowchart representing processes performed in each of the network printers 100 and 200.

As shown in FIG. 5, the host computer 300 uses Internet Group Management Protocol (IGMP) to notify the router that the host computer 300 has joined the particular multicast address 239.255.22.23 (S1). According to the embodiment, the particular multicast address is a multicast address that is stored in the ROM of each of the network printers 100, 200 when the printers are produced. Alternatively, the system can be more flexible if the host computer 300 is designed to designate the multicast address itself or the printers are designed so that the user can input the multicast address to each printer separately.

Next, the host computer 300 transmits a request packet to the multicast address (S2). The packet includes a request for the MAC address of each recipient network printer. Then the host computer 300 waits for responses (S3). When the host computer 300 receives responses from the printers 100 and 200, it displays the MAC addresses and printer names of the printers 100 and 200 in a list on a screen of the display unit 310. The host computer 300 waits for input from the user (S5) and judges whether the user has selected one of the printer names from the displayed list (S6). In this example, the user selects the network printer 100 to set with address information, such as an IP address, and also inputs the address information (S6:YES), whereupon the host computer 300 transmits a packet including the address information to the printer 100 (S7) and waits for a fixed period of time, such as two seconds, for responses from the printers 100 and 200 (S8). Then the host computer 300 judges whether or not it has received an ACK packet, which indicates receipt of address information, from the printer 100. If so (S9:YES), then the host computer 300 displays a message on the screen of the display unit 301, indicating that the address information has been properly set in the printer 100 (S10). If the host computer 300 receives no ACK packet from the network printer 100 (S9:No), then an error message is displayed on the screen of the display unit 301 (S11).

As shown in FIG. 6, each network printer 100, 200 uses IGMP to notify the router that it is a member of the particular multicast address 239.255.22.23 (S12). Then the network printers 100, 200 enter a waiting condition, wherein they wait for packets to be transmitted from the host computer 300 (S13).

When the network printer 100 receives a packet, then the network printer 100 judges whether or not the packet includes a command requesting it to send its MAC address to the multicast address (S14). If so (S14:YES), then the network printer 100 sends a packet including its MAC address and printer name to the particular multicast address (S15).

When the packet received by network printers 100, 200 does not include a command that requests the network printers to send their MAC addresses (S14:NO), then the network printers 100, 200 judge whether the packet is a multicast command that requests the network printers to set address information (S16). If so (S16:YES), then the network printers 100, 200 judge whether the MAC address in the received packet is the same as their own MAC address (S17). In this example, the MAC address in the received packet is the same as the MAC address of the printer 100 (S17:YES), so the network printer 100 sets the address information in the packet as its own address information by storing the IP address in the NV-RAM 4d(S18) and transmits an ACK packet to the particular multicast address to indicate to the host computer 300 that processes for setting address information have been completed. If the packet is not a command that requests the network printer to set address information by multicast (S16:NO), then other suitable processes are performed (S19).

Because the router 10 used in the network of FIG. 3 is a multicast router, IGMP can be used to set address information to network printers. On the other side of the router 10. The host computer 300 and the network printers use IGMP to notify the router that they are members of the specific multicast address. Therefore, the host computer 300 and the network printers can mutually transmit information to each other by using the multicast address.

While the invention has been described in detail with reference to specific embodiments thereof, it would be apparent to those skilled in the art that various changes and modifications may be made therein without departing from the spirit of the invention, the scope of which is defined by the attached claims.

For example, although the embodiment describes the host computer 300 setting address information to only the network printer 100, the host computer 300 could also set address information to the network printer 200 by sending out a packet with the MAC address of the network printer 200 and address information to be set to the network printer 200.

Also, although the embodiment describes only network printers as examples of network devices, the present invention can be used to set address information to any device connected to a network. Also, more than two network devices can be connected to the network.

The router 10 need not a multicast router. In this case, the host computer 300 and network printers in the same group, that is, on the same side of the router, can communicate with each other without using IGMP. Therefore, if the router 10 were not a multicast router, address information can be set by the host computer 300 for devices at nodes n7 to n11 on the same side of the router 10, but not for devices at nodes n1 to n6 on the other side of the router 10.

What is claimed is:

1. An IP address setting system, comprising:
   a plurality of nodes of a network;
   an IP address setting device; and
   a router, the plurality of nodes and the IP address setting device communicating via the router,
   wherein each node of the plurality of nodes has a storing unit that prestores a particular multicast address prior to being included as a node on the network, each node providing notification that the node is a member of the particular multicast address prestored in the storing unit;
   wherein the IP address setting device comprises:
      a request packet transmitting unit that transmits a request packet to the particular multicast address prestored in the storing unit of each node, the request packet requesting transmission of MAC addresses from the nodes of the network,
   wherein the each node has a response transmitting unit that transmits, in response to the request packet, a response to a multicast address, to which the IP address setting device has joined, each response including the MAC address of the each node; and
   wherein the IP address setting device further comprises:
   a response reception unit that receives responses from the nodes to the request packet transmitted by the request packet transmitting unit;
   an address information designation unit (1) that, based on the responses received from the nodes by the response reception unit, designates one node, which has not yet been set with address information that is required for the one node to communicate with the plurality of nodes in the network, to be set with address information including an IP address and (2) that designates the address information,
   wherein the address information designation unit includes:
      a display that displays a list of nodes that transmitted responses;
      a selection unit that enables a user to designate the one node to be set with address information from the list; and
      an address information setting unit that designates the address information for the one node; and a setting packet transmission unit that transmits a setting packet to the particular multicast address, the setting packet including the address information set by the address information designation unit and the MAC address included in the response of the one node.

2. The IP address setting system according to claim 1, wherein the address information further includes a default gateway and a subnet mask.

3. An IP address setting method comprising:

notifying, from a plurality of nodes of a network, that each of the plurality of nodes of a network is a member of a particular multicast address, each node of the plurality of nodes having a storing unit that is prestored with the particular multicast address prior to being included as a node on the network;

transmitting a request packet from an IP address setting device to the particular multicast address prestored in the storing unit of each node, the request packet including a request for a MAC address from the nodes of the network;

transmitting in response to the request packet, a response from the each node to a multicast address, to which the IP address setting device has joined, the response including the MAC address of the corresponding node;

receiving, at the IP address setting device, the responses from the nodes to the request packet;

displaying, at the IP address setting device, a list of nodes that transmitted responses;

determining, at the IP address setting device, selection of one node, which has not yet been set with address information that is required for the one node to communicate with the plurality of nodes in the network, to be set with address information, designated by a user from the list;

designating, at the IP address setting device, the address information, including the IP address, for the one node; and transmitting, from the IP address setting device to the particular multicast address, a setting packet including the address information and the MAC address included in the response from the one node, the request packet and the setting packet being transmitted from the IP address setting device via a router to the particular multicast address of the nodes.

4. The IP address setting method according to claim 3, wherein the address information further includes a default gateway and a subnet mask.

* * * * *